United States Patent [19]

Nakano et al.

[11] Patent Number: 5,597,878
[45] Date of Patent: Jan. 28, 1997

[54] PROCESS OF PRODUCING VINYL CHLORIDE POLYMER

[75] Inventors: Toshihiko Nakano; Tadashi Amano, both of Kamisu, Japan

[73] Assignee: Shin-Etsu Chemical Co., Ltd., Tokyo, Japan

[21] Appl. No.: 505,626

[22] Filed: Jul. 21, 1995

[30] Foreign Application Priority Data

Jul. 22, 1994 [JP] Japan ................................. 6-192181
Sep. 5, 1994 [JP] Japan ................................. 6-235866

[51] Int. Cl.$^6$ ............................ C08F 2/16; C08F 14/06
[52] U.S. Cl. ..................... 526/62; 526/344.2; 526/345
[58] Field of Search ................................ 526/62, 344.2, 526/345

[56] References Cited

U.S. PATENT DOCUMENTS 5,424,377  6/1995  Shimizu et al. ............................ 526/62
5,442,002  8/1995  Shimizu et al. ............................ 526/62

*Primary Examiner*—Thomas R. Weber
*Attorney, Agent, or Firm*—Oblon, Spivak, McClelland, Maier & Neustadt, P.C.

[57] ABSTRACT

A process for the production of a vinyl chloride polymer by suspension polymerization of vinyl chloride, optionally in the presence of other vinyl monomers, in an aqueous medium, in the presence of an oil-soluble polymerization initiator, which is a combination of (A) t-butyl peroxyneoheptanoate, and (B) a peresteric peroxide, such as t-butyl peroxyneodecanoate, other than the above component (A), in a polymerization vessel having at its inner wall surface, a polymer scale deposition preventative coating, which is formed by applying an alkaline coating liquid, of (a) at least one condensation product of a quinone compound and a condensate of a quinone compound with an amino group containing diphenyl compound, and (b) at least one of the substances, a water-soluble polymer compound, an inorganic colloid or an alkali metal silicate, followed by drying the above coating. According to this process, a vinyl chloride polymer can be produced having excellent properties, such as initial coloration, in a short polymerization time, while suppressing deposition of polymer scale in the polymerization vessel.

20 Claims, No Drawings

PROCESS OF PRODUCING VINYL CHLORIDE POLYMER

BACKGROUND OF THE INVENTION

1. Field of the Invention

The present invention relates to a process of producing a vinyl chloride polymer, and more particularly to a process of producing a vinyl chloride polymer having an average polymerization degree as low as 850 or less which is suitable for producing a vinyl chloride polymer in high quality while preventing deposition of polymer scale.

2. Description of the Prior Art

A vinyl chloride polymer is generally produced by suspension polymerization of vinyl chloride monomer or a mixture of vinyl type monomers mainly made up of vinyl chloride monomer in an aqueous medium in the presence of an oil-soluble polymerization initiator and a dispersion stabilizer, and if necessary, a chain transfer agent. Depending on the type of the polymerization initiator used at that time, the polymerization initiator affects greatly the pattern of heat generation, the polymerization time, the productivity, and the deposition of polymer scale during polymerization as well as the quality and characteristics of the polymer, such as initial coloration and heat stability.

In recent years, it is attempted to shorten the polymerization time in order to improve the productivity of vinyl chloride polymers. As one technique of shortening the polymerization time, it is thought to increase the amount of the polymerization initiator to be added. However, as the amount of the polymerization initiator is increased, there occurs a deterioration in the quality of the polymer, especially a deterioration in initial coloration, an increase in deposition of polymer scale in the polymerization vessel.

Particularly in the case of producing a vinyl chloride polymer having a polymerization degree as low as 850 or less, it is required to effect polymerization usually at a temperature of 58° C. or more. However, when the polymerization initiators, which have been conventionally used, such as di-3,5,5-trimethylhexanoyl peroxide, lauroyl peroxide, t-hexyl peroxypivalate and t-amyl peroxypivalate, are used, there occurs disadvantages that the quality of the polymer is lowered and polymer scale is liable to be deposited in the polymerization vessel.

In order to prevent deposition of polymer scale in the polymerization vessel, it has hitherto been carried out that the inner surfaces of the polymerization vessel are coated with, as a polymer scale deposition preventive agent, dyes, pigments, water-soluble polymer compounds, salts of nitrous acid, nitrogen-containing aromatic compounds, heterocyclic compounds, iodine compounds, pyrogallol derivatives, phenolic compounds and aromatic amine compounds. However, these conventional polymer scale deposition preventive agents can not suppress effectively polymer scale deposition in the polymerization vessel, especially gas phase part and gas phase-liquid phase interface part and thereabout during producing a vinyl chloride polymer having a low polymerization degree.

SUMMARY OF THE INVENTION

The present invention has been accomplished in view of the above conventional problems, and an object of the present invention is to provide a process of producing a vinyl chloride polymer excellent in quality such as initial coloration or the like in a short polymerization time, while suppressing deposition of polymer scale in a polymerization vessel.

To attain the above object, the present invention provides a process of producing a vinyl chloride polymer, which comprises suspension polymerizing a vinyl chloride monomer material consisting of either vinyl chloride or a mixture of vinyl monomers containing vinyl chloride in an aqueous medium in the presence of an oil-soluble polymerization initiator in a polymerization vessel having, at its inner wall surface, a polymer scale deposition preventive coating, wherein said polymer scale deposition preventive coating has been formed by applying an alkaline coating liquid to said inner wall surface, followed by drying, said alkaline coating liquid comprising:

(a) at least one condensation product selected from the group consisting of (a-1) a condensate, which has a molecular weight of 400 to 50,000, of a quinone compound and (a-2) a condensate of a quinone compound with a diphenyl compound containing at least two amino groups represented by the following general formula (1):

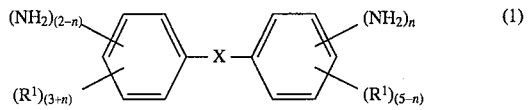

wherein a plurality of $R^1$, which may be the same or different, represent —H, —OH, —COOH, —SO$_3$H, —NH$_2$, —Cl, —NO$_2$, —COCH$_3$, —OCH$_3$ —N(CH$_3$)$_2$, and an alkyl group having 1 to 3 carbon atoms, X represents a bivalent group selected from the group consisting of an alkylene group having 1 to 5 carbon atoms, —N(CH$_3$)—, —C(CH$_3$)$_2$—, —CONH—, —P(=O)H—, —SO$_2$—, —O—, —S—, and —Si(R)$_2$— in which R represents an alkyl group having 1 to 10 carbon atoms, and n is an integer of from 1 to 2, and (b) at least one substance selected from the group consisting of a water-soluble polymer compound, an inorganic colloid and an alkali metal silicate; and wherein said oil-soluble polymerization initiator comprises a combination of:

(A) a t-butyl peroxyneoheptanoate, and (B) a peresteric peroxide other than the t-butyl peroxyneoheptanoate of the above component (A), said peresteric peroxide of (B) being such that a 10-hour half-life period temperature of a benzene solution containing 0.1 mol of the peresteric peroxide per liter of benzene is 44° to 55° C.

Therefore, the process of producing a vinyl chloride polymer according to the present invention has a novel feature in that the suspension polymerization is carried out in the presence of a specified oil-soluble polymerization initiator in a polymerization vessel having a specified polymer scale deposition preventive coating.

According to the process of the present invention, it can produce a vinyl chloride polymer excellent in quality such as initial coloration or the like in a short polymerization time, while suppressing deposition of polymer scale in the polymerization vessel. Thus, the productivity is remarkably improved. Especially, suppression of polymer scale deposition on the liquid phase part and the interface part and thereabout, on which parts it has hitherto been difficult to suppress the deposition, is further ensured, operation times necessary for removal of polymer scale are remarkably reduced, and it becomes possible to continuously use a polymerization vessel for a long period of time.

DETAILED DESCRIPTION OF PREFERRED EMBODIMENTS

Polymer scale deposition preventive coating

The polymer scale deposition preventive coating used in the process of the present invention is formed by applying an alkaline liquid to the inner wall surface, followed by drying, said alkaline liquid comprising (a) at least one condensation product selected from the group consisting of (a-1) a condensate, which has a molecular weight of 400 to 50,000, of a quinone compound and (a-2) a condensate of a quinone compound with a diphenyl compound containing amino groups represented by said general formula (1), and (b) a water-soluble polymer compound or the like.

[(a)Condensation products]

The quinone compound used in the preparation of the condensation product (a) include, for example, compounds represented by the following formulae (2) to (5):

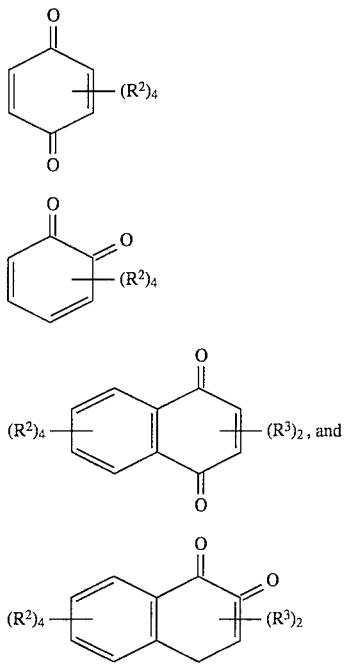

wherein $R^2$, which may be the same or different, represent a group selected from the group consisting of —H, —NH$_2$, —Cl, —Br, —OH, —NO$_2$, —COCH$_3$, —OCH$_3$, —N(CH$_3$)$_2$, —COOH, —SO$_3$H, and an alkyl group having 1 to 3 carbon atoms, and a plurality of $R^3$, which may be the same or different, represent a group selected from the group consisting of —H, —Cl, —Br, OH, —COCH$_3$, —OCH$_3$, —CH$_3$, —COOH, and —SO$_3$H.

Specific examples of the above benzoquinone compound represented by the general formulae (2) and (3) include o-, m-, and p-benzoquinones, hydroxy-p-benzoquinone, chloro-p-benzoquinone, bromo-p-benzoquinone, duroquinone, and chloranil.

Specific examples of the above naphthoquinone compound represented by the above general formulae (4) and (5) include 6-methyl-1,4-naphthoquinone, 2-methyl-1,4-naphthoquinone, lawsone, juglone, plumbagin, α-naphthoquinone, and β-naphthoquinone.

Out of these quinone compounds, o- and p-benzoquinones, α-naphthoquinone, β-naphthoquinone, and lawsone are preferable.

The above quinone compounds may be used singly or in a combination of two or more thereof. Condensate (a-1):

The condensate (a-1) of a quinone compound among the condensation products (a) should have a molecular weight in the range of 400 to 50,000, preferably 600 to 20,000, and more preferably 2,000 to 20,000. Where the molecular weight of the above condensate is less than 400, the polymer scale deposition preventive effect is low, while if the molecular weight of the above condensate is over 50,000, the solubility of said condensation product in water and an organic solvent is lowered to make impossible the preparation of a uniform coating liquid, the obtained coating is nonuniform, and as a result the polymer scale deposition preventive effect is lowered.

The condensate (a-1) among the condensation products (a) is produced, for example, by carrying out the condensation reaction of the above quinone compound in a suitable solvent generally at 20 to 150° C. for 2 to 200 hours.

At that time, it is preferable to carry out the reaction in the presence of an alkaline compound to facilitate the condensation reaction. In the case where the reaction is carried out in the presence of said alkaline compound, a condensation product having a desired molecular weight can be produced by reacting the above quinone compound generally at 20° to 150° C. for 1 to 100 hours. In that case, the amount of said alkaline compound used is preferably in the range of 0.01 to 100 parts by weight, and more preferably 0.1 to 10 parts by weight, per 100 parts by weight of the quinone compound. Said alkaline compound includes, for example, a hydroxide of an alkali metal, such as LiOH, NaOH, and KOH.

In the above condensation reaction, if necessary, an oxidizing agent can be used as a condensation calalyst.

Such an oxidizing agent includes, for example, an elemental or molecular halogen, such as iodine, bromine, chlorine, and fluorine; an oxyacid or oxyacid salt of a halogen, such as iodic acid, periodic acid, potassium periodate, and sodium periodate; an inorganic peroxide, such as hydrogen peroxide, sodium peroxide, potassium persulfate, and ammonium persulfate; an organic peroxide, such as peracetic acid, benzoyl peroxide, cumene hydroperoxide, perbenzoic acid, and p-methane hydroperoxide; a chloride and a sulfate of a metal selected from iron and copper, such as ferrous chloride, ferric chloride, copper sulfate, and cuprous chloride; an azo compound, such as α,α'-azobisisobutyronitrile and α,α'-azobis-2,4-dimethylvaleronitrile; and an aromatic nitro compound, such as nitrobenzene, o-, m-, or p-oxynitrobenzene, o-, m-, or p-nitroanisol, o-, m-, or p-chloronitrobenzene, o-, m-, or p-nitrobenzoic acid, and o-, m-, or p-nitrobenzenesulfonic acid.

As the solvent used in the above condensation reaction, for example, an organic solvent, such as alcohols, ketones, and esters, is used, and out of them, it is preferable to use an organic solvent miscible with water. Examples of the organic solvent miscible with water include alcohols, such as methanol, ethanol, and propanol; ketones, such as acetone, and methyl ethyl ketone; esters, such as methyl acetate and ethyl acetate; aprotic solvents, such as dimethylformamide, dimethyl sulfoxide, and acetonitrile, with preference being given particularly to alcohols. It is possible to use a mixed solvent of water with the above organic solvent miscible with water.

Condensate (a-2):

The condensate (a-2) among the condensation products (a) is produced, for example, by reacting the above diphenyl compound containing amino groups of the general formula (1) with the above quinone compound in a suitable solvent, generally at room temperature to 200° C. for 0.5 to 100 hours, and preferably at room temperature to 150° C. for 3 to 30 hours, if necessary, in the presence of a catalyst.

Specific examples of the above diphenyl compound include 4,4'-diaminodiphenyl sulfide, 4,4'-diaminodiphenyl ether, 4,4'-diaminodiphenylpropane, 4,4'-diaminodiphenyl sulfone, bis(4-aminophenyl)diethylsilane, bis(4-aminophenyl)phosphine oxide, bis(4-aminophenyl)-N-methylamine, 4,4'-diaminobenzanilide, and 4,4'-diaminodiphenylmethane.

Out of them, 4,4'-diaminodiphenyl sulfone, 4,4'-diaminobenzanilide, 4,4'-diaminodiphenyl ether, and 4,4'-diaminodiphenylmethane are preferable.

The above diphenyl compounds may be used singly or in a combination of two or more thereof.

Generally since the quinone compounds act as a condensation catalyst, it is not necessary to particularly add the other condensation catalysts thereto. However, in case where the other condensation agents are added, the above-mentioned oxidizing agents can be used as the other condensation catalysts. Examples of solvents used in the condensation reaction are also as mentioned above.

The pH of the solvent medium in which the condensation reaction is carried out may generally be in the range of 1 to 13 and a pH adjuster can be used without any particular restriction.

Although the ratio of the above diphenyl compound to the above quinone compound is influenced, for example, by the type of the components and the solvent to be used, the reaction temperature, and the reaction time, generally the quinone compound is preferably used in an amount of 0.01 to 10 parts by weight, and more preferably 0.1 to 5 parts by weight, per part by weight of the diphenyl compound. A too large or too small amount of the quinone compound causes sometimes the polymer scale deposition preventive effect of the resulting condensation product to be lowered.

[(b) Water-soluble polymer compound, etc.]

The coating liquid contains, in addition to the condensation product (a), at least one substance (b) selected from the group consisting of water-soluble polymer compounds, inorganic colloids, and silicates of alkali metals. As a result, the scale deposition preventive action of the obtainable coating is further improved. Water-soluble polymer compound:

The water-soluble polymer compound includes, for example, an amphoteric polymer compound, such as gelatin and casein; an anionic polymer compound, such as polyacrylic acid, polystyrenesulfonic acid, carboxymethylcellulose, and alginic acid; a nitrogen-containing cationic polymer compound, such as polyvinylpyrrolidone and polyacrylamide; and a hydroxyl group-containing polymer compound, such as polyvinyl alcohol, hydroxyethylcellulose, hydroxypropylcellulose, and pectin. Preferable water-soluble polymer compounds are gelatin, casein, a polyacrylic acid, carboxymethylcellulose, polyvinylpyrrolidone, and pectin. These water-soluble polymer compounds may be used singly or in combination of two or more.

Inorganic colloid:

The inorganic colloid is a particulate colloid which is produced by the dispersion method using water as a dispersion medium or the agglomeration method and wherein the size of the colloid particles is 1 to 500 µm.

Specifically the inorganic colloid includes, for example, a colloid of an oxide of and a colloid of a hydroxide of a metal selected from the group consisting of aluminum, thorium, titanium, zirconium, antimony, tin, iron, and the like, a colloid of tungstic acid, vanadium pentoxide, gold, or silver, a silver iodide sol, and a colloid of selenium, sulfur, silica, or the like. Out of these, preferable inorganic colloids are a colloid of an oxide of and a colloid of a hydroxide of a metal selected from the group consisting of aluminum, titanium, zirconium, tin, and iron; and colloidal silica. These inorganic colloids may be used singly or in combination of two or more.

Alkali metal silicate:

The alkali metal silicate includes, for example, a metasilicate ($M_2SiO_3$), an orthosilicate ($M_4SiO_4$), a disilicate ($M_2Si_2O_3$), a trisilicate ($M_3Si_3O_7$), and a sesquisilicate ($M_4Si_3O_{10}$) of an alkali metal, such as lithium, sodium, and potassium, wherein M represents an alkali metal, such as lithium, potassium and sodium, and preferably sodium; and water glass.

These alkali metal silicates may be used singly or in a combination of two or more thereof.

These components (b) are used generally in an amount of 0.01 to 10 parts by weight, and more preferably 0.05 to 5 parts by weight, per part by weight of the above condensation product (a).

Preferably, the water-soluble polymer compound is used together with at least one substance selected from the inorganic colloid and the alkali metal silicate. That is, at least it is preferable to use a combination of the water-soluble polymer compound with the inorganic colloid or a combination of the water-soluble polymer with the alkali metal silicate.

In case where a combination of the water-soluble polymer compound with the inorganic colloid is used, it is preferable to use the inorganic colloid in an amount of 5 to 3,000 parts by weigh, and more preferably 50 to 1,000 parts by weight, per 100 parts by weight of the water-soluble compound. In case where a combination of the water-soluble polymer compound with the alkali metal silicate is used, the alkali metal silicate is used in an amount of 5 to 3,000 parts by weight, and more preferably 50 to 1,000 parts by weight, per 100 parts by weight of the water-soluble polymer compound.

[Coating liquid]

The coating liquid used for the formation of the polymer scale deposition preventive coating as a polymer scale deposition preventive agent is prepared, for example, by adding to a solution containing the condensation product (a) obtained by the above condensation reactions the below-mentioned solvent as required, and adjusting the obtained solution to alkalinity in the case wherein the obtained solution is not alkaline. The coating liquid may also be prepared by charging the above solution containing the condensation product into cold water to precipitate the condensation product (a), then filtering and drying the precipitate, adding the dried precipitate to the solvent shown below, and adjusting it alkaline.

To make the coating liquid alkaline improves the solubility of the condensation product (a) in the solvent. As a result, the coating liquid becomes a uniform solution and therefore the coating obtained therefrom becomes uniform to improve the polymer scale deposition preventive effect.

The pH of the coating liquid is preferably in the range of 7.5 to 13.5, and more preferably in the range of 8.0 to 12.5. Alkaline compounds used for the adjustment of the pH include, for example, an alkali metal compound and an ammonium compound, such as LiOH, NaOH, KOH, Na2CO$_3$, Na$_2$HPO$_4$, and NH$_4$OH, and an organic amine compound, such as ethylenediamine, monoethanolamine, diethanolamine, and triethanolamine.

Solvents used for the preparation of the above polymer scale deposition preventive agent include, for example, water; an alcohol solvent, such as methanol, ethanol, propanol, butanol, 2-butanol, 2-methyl-1-propanol, 2-methyl-2-propanol, 3-methyl-1-butanol, 2-methyl-2-butanol, and 2-pentanol; a ketone solvent, such as acetone, methyl ethyl ketone, and methyl isobutyl ketone; an ester solvent, such as methyl formate, ethyl formate, methyl acetate, ethyl acetate, and methyl acetoacetate; an ether solvent, such as 4-methyldioxolane, and ethylene glycol diethyl ether; furans; and an aprotic solvent, such as dimethylformamide, dimethyl sulfoxide, and acetonitrile. These solvents may suitably be used singly or in a combination of two or more thereof.

Out of the above solvents, water and a mixed solvent of water with an organic solvent compatible with water are preferable. Among the above-mentioned organic solvents, the organic solvent compatible with water includes, for example, an alcohol solvent, such as methanol, ethanol, and propanol; a ketone solvent, such as acetone and methyl ethyl ketone; and an ester solvent, such as methyl acetate and ethyl acetate. In case where a mixed solvent of water and an organic solvent compatible with water is used, the content of the organic solvent in the mixed solvent is preferably so selected as to avoid dangers of inflammation, explosion or the like and obviate problems to safety in handling, e.g., toxicity. Specifically, the content of the organic solvent is 50% by weight or less, and more preferably 30% by weight.

The concentration of the condensation product (a) in the above alkaline solution is not particularly restricted so long as the below-described total coating amount is secured, but the concentration is generally 0.001 to 5% by weight, and preferably 0.01 to 1% by weight.

[Formation of the coating]

The coating liquid obtained in the above-described manner is applied onto at least the inner wall surface of a polymerization vessel and is dried to form a coating. The drying operation is carried out sufficiently, for example, at a temperature ranging from room temperature to 100° C., followed by washing with water if necessary. The thus formed coating prevents effectively scale from being deposited.

Preferably the polymer scale deposition preventive coating is applied not only onto the polymerization vessel inner wall surface but also onto other parts which may contact with the monomer during the polymerization. Said other parts include, for example, stirring blades, stirring shaft, baffles, condenser, header, search coil, bolts, and nuts.

The method of applying the coating liquid onto the polymerization vessel inner wall surface and the like is not particularly restricted and, for example, the brushing method, the spray coating method, and a method wherein the polymer scale deposition preventive agent is filled into the polymerization vessel and then is removed, as well as automatic coating methods described, for example, in Japanese Pre-examination Patent Publication (KOKAI) Nos. 57-61001 and 55-36288, Japanese Patent Publication (KOKOKU) Nos. 56-501116 and 56-501117, and Japanese Pre-examination Patent Publication (KOKAI) No. 59-11303 can be used.

The method of drying the wet surface after the application of the coating liquid is not restricted and, for example, the following method can be employed. That is, use is made, for example, of a method wherein after the polymer scale deposition preventive agent is applied, the coated surface is exposed to a warm wind whose temperature has been suitably elevated, or a method wherein the polymerization vessel inner wall surface and other surfaces to which the polymer scale deposition preventive agent should be applied are previously heated, for example, to 30 to 80° C. and then the polymer scale deposition preventive agent is directly applied onto the thus heated surfaces. After drying the coated surface, the coated surface is washed with water if required.

The thus obtained coating is preferably such that the total coating amount after drying is generally 0.001 to 5 g/m$^2$, and particularly 0.05 to 2 g/m$^2$.

The above coating operation may be carried out each time for the polymerization of 1 to 10 odd batches. Since the formed coating is high in durability and the polymer scale deposition preventive action lasts, the coating operation is not necessarily carried out each time for the polymerization of one batch and therefore the productivity is improved.

Polymerization initiator

One oil-soluble polymerization initiator (A) used in the process of the present invention is t-butyl peroxyneoheptanoate.

The other oil-soluble polymerization initiator (B) is a peresteric peroxide other than t-butyl peroxyneoheptanoate (A), said peresteric peroxide being such that a 10-hour half-life period temperature of a benzene solution containing 0.1 mole of the peresteric peroxide per liter of benzene is in the range of 44° to 45° C., preferably 44° to 50° C. If the 10-hour half-life period temperature of the peresteric peroxide is lower than 44° C., the amount of heat generated within a polymerization vessel at the initial stage of the polymerization of a low polymerized vinyl chloride monomer in which the polymerization is carried out usually at a polymerization temperature of 58° C. or more, increases so that it becomes difficult to suitably remove the heat from the polymerization vessel. If such an peresteric peroxide that said 10-hour half-life period temperature is over 55° C. is used, an excessively large amount of the polymerization initiator is required which is uneconomical, and the quality of the resulting polymer, such as initial coloration, may be lowered.

Specific examples of such a polymerization initiator (B) include t-hexyl peroxyneodecanoate (said 10-hour half-life period temperature: 44.7° C., the same 10-hour half-life period temperature in parentheses being applied hereinafter), t-butyl peroxyneodecanoate (46.5° C.), t-hexyl peroxyneohexanoate (49.7° C.), t-butyl peroxyneohexanoate (52.1° C.) and t-hexyl peroxypivalate (53.2° C.). Among these, preferred are t-butyl peroxyneodecanoate, t-hexyl peroxyneohexanoate, t-hexyl peroxyneodecanoate, and t-butyl peroxyneohexanoate, and particularly preferred is t-butyl peroxyneodecanoate. They may be used singly or in a combination of two or more thereof.

"10-hour half-life period temperature" means the temperature at which the half-life period of an organic peroxide is 10 hours. Generally, the 10-hour half-life period temperature of an organic peroxide is determined according to the known method as follows:

A solution containing 0.1 mole of the organic peroxide in 1 liter of benzene is hermetically placed in a glass tube and maintained at a predetermined temperature to decompose the organic peroxide. The change in the concentration of the organic peroxide with time is measured. Since the above decomposition reaction can be regarded approximately as a first-order reaction, the following equations can be obtained:

$$dx/dt = k(a-x) \qquad (1)$$

$$ln\,[a/(a-x)] = kt \qquad (2)$$

wherein x denotes the concentration of the organic peroxide, a denotes the initial concentration of the organic peroxide, k denotes the decomposition rate constant, and t denotes time.

Since the half-life period $t_{1/2}$ is the time when $x = a/2$ in the equation (2), the following relationship is obtained:

$$kt_{1/2} = ln\,2 \qquad (3)$$

Since the constant k can be calculated from the change in the concentration of the peroxide, as measured above, and the equation (2), the half-life period $t_{1/2}$ is determined.

The mixing ratio of the polymerization initiator (A) to the polymerization initiator (B), that is, (A)/(B) is preferably from 1/9 to 9/1, and more preferably 1/5 to 5/1, by weight. If the ratio (A)/(B) is smaller than 1/9, the initial coloration is deteriorated and the amount of polymer scale deposition increases. Further, since the amount of heat generated in a polymerization apparatus is much and excess during the initial stage of polymerization at which stage the polymerization conversion percentage is 3 to 30%, the capacity of a polymerization apparatus for removing the heat generated therein becomes insufficient so that it is sometimes difficult to keep the polymerization temperature constant and it becomes difficult to produce the intended polyvinyl chloride having an average polymerization degree. While, if the ratio (A)/(B) is larger than 9/1, the initial coloration is deteriorated and the amount of polymer scale deposition increases.

The total amount of the peroxides (A) and (B) constituting said oil-soluble polymerization initiators to be added is generally 0.02 to 0.12 part by weight, preferably 0.04 to 0.1 part by weight, and more preferably 0.05 to 0.1 part by weight, based on 100 parts by weight of the vinyl chloride monomer material to be charged. If said total amount is too large, since the load of the generated heat on the initial stage of polymerization increases, suitable removal of the heat from the polymerization apparatus is liable to be difficult and further it is not preferable in the quality of the resulting polymer, for example, a fear of deterioration in the initial coloration of the polymer. If the total amount is too small, it is difficult to shorten the polymerization time.

The method of charging the polymerization initiator into a polymerization vessel is not particularly restricted and any conventionally known methods can be employed, for example, the polymerization initiator may be charged as a solution diluted with a solvent or may be charged as an emulsion or suspension dispersed in water. Further, the polymerization initiator may be charged together with water and/or a suspension agent or after the charging of water and/or a suspension agent, or the polymerization initiator may be pumped into the polymerization vessel after the charging of the vinyl chloride monomer material.

Polymerization

The other polymerization conditions etc. (for example, methods for charging an aqueous medium, vinyl chloride monomer material and dispersing agent into a polymerization vessel, and the amounts thereof charged) used in the process of the production of polyvinyl chloride polymers according to the present invention may generally be similar to those conventionally used in suspension polymerization of vinyl chloride or the like.

The polymerization is generally carried out at 40° to 70° C. within which range the polymerization is not particularly restricted. When producing a low polymerized polyvinyl chloride polymer having an average polymerization degree of 850 or less, the polymerization carried out at preferably 58° C. or more, and more preferably 59° to 68° C.

As the vinyl chloride monomer material, there can be used vinyl chloride alone or otherwise a mixture of vinyl chloride, as a main component, and the other monomer copolymerizable with vinyl chloride (the amount of the vinyl chloride in the mixture generally being 50% by weight or more). The monomer copolymerizable with vinyl chloride includes, for example, an α-olefin, such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; an acrylic acid or its ester, such as acrylic acid, methyl acrylate and ethyl acrylate; a methacrylic acid or its ester, such as methacrylic acid and methyl methacrylate; maleic acid or its ester; a vinyl ester, such as vinyl acetate and vinyl propionate; a vinyl ether, such as lauryl vinyl ether and isobutyl vinyl ether; maleic anhydride; acrylonitrile; styrene; and vinylidene chloride. These may be used singly or in a combination of two or more thereof.

The dispersing agent may be any one which is generally used for suspension polymerization of the vinyl chloride monomer material in an aqueous medium. The dispersing agents include, for example, a water-soluble cellulose ether, such as methyl cellulose, hydroxyethyl cellulose, hydroxypropyl cellulose, and hydroxypropyl methyl cellulose; a water-soluble or oil-soluble partially saponified polyvinyl alcohol; an acrylic acid polymer; a water-soluble polymer, such as gelatin; an oil-soluble emulsifier, such as sorbitan monolaurate, sorbitan trioleate, glycerin tristearate, and an ethylene oxide/propylene oxide block copolymer; and a water-soluble emulsifier, such as polyoxyethylene sorbitan monolaurate, polyoxyethylene glycerin oleate, and sodium laurate. These are used singly or in a combination of two or more thereof.

As the aqueous medium, generally, deionized water is used. Further, to the polymerization system, if necessary, may be added various additives which are suitably used for suspension polymerization of vinyl chloride and the like. The additives include, for example, polymerization modifiers, chain transfer agents, pH adjusters, gelation improvers, antistatic agents, crosslinking agents, stabilizers, fillers, antioxidants, buffers, and scale preventive agents.

EXAMPLES

Now, the present invention is described in detail with reference to Examples which are not to be construed as limiting the present invention.

Example 1

First, a polymer scale deposition preventive agent (I) of the present invention was produced in the following manner:

A mixed solvent made up of 450 g of methanol and 450 g of water was placed in a polymerization vessel equipped with a reflux condense and having an internal volume of 2 liters and then 100 g of α-naphthoquinone as the quinone compound and 10 g of sodium hydroxide were added. Then, the internal temperature of the vessel was elevated to 65° C. and after the mixture in the reactor was reacted at 65° C. for 10 hours, it was cooled to room temperature. Thus, a solution of a condensate (a-1) was obtained.

The molecular weight of the thus obtained condensate (a-1) was measured by the following method and was found to be 3,000.

Measurement of the molecular weight

The molecular weight was measured by gel permeation chromatography (GPC). The molecular weight indicates the number-average molecular weight in terms of polystyrene. The measurement conditions were as follows:

Column: Guard column
  Trade name: slim-pack GPC-803D, 802D (manufactured by Shimazu Corporation)
Analytical column
  trade name: slim-pack GPC-803D, 802D (manufactured by Shimazu Corporation)
Mobile phase: 10 mM; LiBr/DMF
Flow rate: 1.0 ml/min
Detector: RI
Temperature: 60° C.

The condensate (a-1), gelatin (b), and colloidal silica (trade name: Snowtex CXS-9 manufactured by Nissan Chemical Industries, LTD.; colloid particle size: 5 to 7 mμ) (c) were dissolved in a solvent made up of water/methanol (in a weight ratio of 7/3) to prepare such a solution that the weight ratio of (a-1)/(b)/(c) =1/1/1 (weight ratio) and the total concentration of (a-1)+(b) +(c) was 0.5%, and then the pH of the solution was adjusted to 11.0 with NaOH to obtain a polymer scale deposition preventive agent (I).

The thus prepared above polymer scale deposition preventive agent (I) was applied to the inner wall of a stainless steel polymerization vessel having an internal volume of 2.1 $m^3$, the stirring shaft, the stirring blades, and other parts with which a monomer would contact during the polymerization and was heated at 40° C. for 15 minutes to be dried to thereby form a coating and then the inside of the polymerization vessel was washed with water. Then, an aqueous solution of 210 g of a partially saponified polyvinyl alcohol and 140 g of hydroxypropyl methylcellulose in 880 kg of deionized water was charged into the polymerization vessel. After the inside of the polymerization vessel was evacuated to 50 mmHg, 700 kg of vinyl chloride monomer was charged, then the polymerization initiator whose type and amount are shown in Table 1 was pumped into the polymerization vessel with stirring, and at the same time the temperature was elevated to start the polymerization.

The polymerization reaction was carried out while keeping the polymerization temperature at 63° C., then when the internal pressure of the polymerization vessel reached 7.5 $kg/cm^2G$, the polymerization was stopped, and the unreacted monomer was recovered. After the obtained polymer in a slurry state was taken out of the polymerization vessel, the polymer was dehydrated and dried.

Comparative Example 1

10 g of C.I. Direct Blue 1 and 2 g of C.I. Basic Blue 12 were dissolved in 2,000 ml of ion-exchanged water and then 17 g of phytic acid was added thereto to prepare an aqueous solution, which was named a polymer scale deposition preventive agent (II).

The polymer scale deposition preventive agent (II) was applied to the inside of a polymerization vessel similarly to Example 1, and then was heated at 50° C. for 10 minutes to be dried to thereby form a coating, and the inside of the polymerization vessel was washed with water.

Then, the polymerization of vinyl chloride monomer was carried out similarly to Example 1, except that the polymerization initiator shown in Table 1 was used, thereby obtaining a polymer.

Comparative Example 2

The polymerization of Comparative Example 1 was repeated, except that the polymerization initiator shown in Table 1 was used, thereby obtaining a polymer.

Comparative Example 3

The polymerization of Comparative Example 1 was repeated, except that the scale preventive agent shown in Table 2 was used, thereby obtaining a polymer.

Comparative Example 4

The polymerization of Example 1 was repeated, except that the polymerization initiator shown in Table 2 was used, thereby obtaining a polymer.

Comparative Example 5

The polymerization of Example 1 was repeated, except that the polymerization initiator shown in Table 2 was used, thereby obtaining a polymer. In this case, the polymerization temperature could not be kept at 63° C. and the internal temperature of the vessel rose temporally by about 3° C. since the capacity of removal of the heat generated in the polymerization apparatus was insufficient to keep the polymerization temperature at 63° C.

Example 2

After a coating of the polymer scale deposition preventive agent (I) was formed on the inside of a polymerization vessel in the same manner as in Example 1 and the inside of the vessel was washed with water, an aqueous solution of 303 g of a partially saponified polyvinyl alcohol and 240 g of hydroxypropylmethylcellulose in 870 kg of deionized water was charged into the polymerization vessel. After the inside of the polymerization vessel was evacuated to 50 mmHg, 730 kg of vinyl chloride monomer was charged, then the polymerization initiator shown in Table 3 was pumped into the polymerization vessel with stirring, and at the same time the temperature was elevated to start the polymerization. After 1 hour from starting the elevation of the temperature, 204 g of 2-mercaptoethanol was pumped into the vessel.

The polymerization reaction was carried out while keeping the polymerization temperature at 62° C., then when the internal pressure of the polymerization vessel reached 7.2 $kg/cm^2G$, the polymerization was stopped, and the unreacted monomer was recovered. After the obtained polymer in a slurry state was taken out of the polymerization vessel, the polymer was dehydrated and dried.

Example 3

The polymerization of Example 2 was repeated, except that the polymerization initiator shown in Table 3 was used, thereby obtaining a polymer.

Comparative Example 6

The polymerization of Example 2 was repeated to obtain a polymer, except that: the polymer scale deposition preventive agent (II) was used in place of the polymer scale deposition preventive agent (I), a coating was formed on the inside of a polymerization vessel in the same manner as in Comparative Example 1 and therafter the inside of the vessel was washed with water, and the polymerization initiator shown in Table 3 was used.

Comparative Example 7

The polymerization of Example 2 was repeated to obtain a polymer, except that a coating was formed on the inside of a polymerization vessel in the same manner as in Comparative Example 1 and therafter the inside of the vessel was washed with water, and the polymerization initiator shown in Table 4 was used.

Comparative Example 8

The polymerization of Example 2 was repeated to obtain a polymer, except that the polymer scale deposition preventive agent (II) was used in place of the polymer scale deposition preventive agent (I), a coating was formed on the inside of a polymerization vessel in the same manner as in Comparative Example 1 and therafter the inside of the vessel was washed with water, and the polymerization initiator shown in Table 4 was used.

The quality of each of the thus obtained polymers was evaluated by the following methods. The results are shown in Tables 1 to 4.

Average polymerization degree:

This was measured in accordance with JIS K-6721.

Bulk specific gravity:

This was measured in accordance with JIS K-6721.

Particle size distribution:

The obtained polymer was sieved through #60, #100, and #200 sieves according to JIS Z-8801 and the passed amounts and the residual amounts were weighed and expressed in terms of % by weight.

Initial coloration:

100 parts by weight of the obtained polymer, 1 part by weight of tin laurate, 0.5 part by weight of a cadmium-containing stabilizer, and 50 parts by weight of dioctyl phthalte were mixed and they were blended with a two-roll mill at 160° C. for 5 minutes and the resulting mixture was formed into a sheet having a thickness of 0.8 mm. Then the sheet was cut into pieces, the pieces were layered and then were placed in a frame having an internal volume of 4 cm×4 cm×1.5 cm, and the pieces in the frame were hot-pressed at 160° C. under 65 to 70 kgf/cm$^2$ for 10 minutes to make a test specimen. The specimen sheet was observed with the naked eye to evaluate the initial coloration of the sheet according to the following criterion.

A: Pale yellow and good (Example 1)

B: Dark yellow and bad compared with Example 1

State of polymer scale deposition:

After the polymerization was repeated 10 batches (times), the inside of the polymerization vessel was observed with the naked eye and the state or degree of polymer scale deposition was evaluated according to the following criterion.

A: No or substantially no polymer scale deposition was observed not only at the gaseous phase-liquid phase interface and thereabout but also at the gaseous phase part and the liquid phase part, of the inner wall surface of the polymerization vessel.

B: Polymer scale deposition was observed at the gaseous phase-liquid phase interface and thereabout of said inner wall surface.

C: Polymer scale deposition was observed at the gaseous phase part and the gaseous phase-liquid phase interface and thereabout of said inner wall surface.

D: Polymer scale deposition was observed at the liquid phase part and the gaseous phase-liquid phase interface and thereabout of said inner wall surface.

In the following tables, the abbreviations for polymerization initiators have the meanings given below:

BPNp: t-butyl peroxyneoheptanoate (the 10-hour half-life period temperature: 50° C.)

BPD: t-butyl peroxyneodecanoate (ditto: 46.5° C.)

HPV: t-hexyl peroxypivalate (ditto: 53.2° C.)

THP: di-3,5,5-trimethylhexanoylperoxide (ditto: 59.5° C.)

TABLE 1

|  | Example 1 | Comparative Example 1 | Comparative Example 2 |
| --- | --- | --- | --- |
| Scale deposition preventive agent | I | II | II |
| Polymerization initiator | BPNp/ BPD = 1/1 | THP/ BPD = 1/1 | BPNp/ BPD = 1/1 |
| (weight % based on monomer) | 0.050 | 0.070 | 0.050 |
| Polymerization time | 4 hr 02 min | 4 hr 05 min | 4 hr 01 min |
| Average polymerization degree | 820 | 820 | 820 |
| Bulk specific gravity (g/mL) | 0.568 | 0.566 | 0.567 |
| Particle size distribution (pass %) #60 | 100 | 100 | 100 |
| #100 | 60.5 | 62.8 | 61.8 |
| #200 | 1.8 | 1.5 | 1.7 |
| Initial coloration | A | B | B |
| State of polymer scale deposition | A | D | B |

TABLE 2

|  | Comparative Example 3 | Comparative Example 4 | Comparative Example 5 |
| --- | --- | --- | --- |
| Scale deposition preventive agent | I | I | I |
| Polymerization initiator | THP/BPD = 1/1 | BPNp | BPD |
| (weight % based on monomer) | 0.070 | 0.070 | 0.050 |
| Polymerization time | 4 hr 03 min | 4 hr 02 min | 3 hr 55 min |
| Average polymerization degree | 820 | 820 | 750 |
| Bulk specific gravity (g/mL) | 0.568 | 0.566 | 0.578 |
| Particle size distribution (pass %) #60 | 100 | 100 | 100 |
| #100 | 62.5 | 61.5 | 75.5 |
| #200 | 1.6 | 1.6 | 1.8 |
| Initial coloration | B | B | B |
| State of polymer scale deposition | B | D | D |

TABLE 3

|  | Example 2 | Example 3 | Comparative Example 6 |
| --- | --- | --- | --- |
| Scale deposition preventive agent | I | I | II |
| Polymerization initiator | BPNp/ BPD = 1/2 | BPNp/ BPD = 1/1 | THP/ BPD = 4/5 |
| (weight % based on monomer) | 0.064 | 0.062 | 0.075 |
| Polymerization time | 3 hr 55 min | 4 hr 01 min | 4 hr 31 min |
| Average polymerization degree | 690 | 690 | 690 |
| Bulk specific gravity (g/mL) | 0.562 | 0.561 | 0.560 |
| Particle size distribution (pass %) #60 | 100 | 100 | 100 |
| #100 | 95.0 | 92.0 | 91.2 |
| #200 | 5.5 | 5.0 | 4.5 |
| Initial coloration | A | A | B |
| State of polymer scale deposition | A | A | D |

TABLE 4

|  |  | Comparative Example 7 | Comparative Example 8 |
| --- | --- | --- | --- |
| Scale deposition preventive agent |  | I | II |
| Polymerization initiator |  | HPV/BPD = 1/1 | HPV/BPD = 1/1 |
| (weight % based on monomer) |  | 0.062 | 0.062 |
| Polymerization time |  | 4 hr 05 min | 4 hr 06 min |
| Average polymerization degree |  | 690 | 690 |
| Bulk specific gravity (g/mL) |  | 0.555 | 0.556 |
| Particle size distribution (pass %) | #60 | 100 | 100 |
|  | #100 | 92.3 | 93.4 |
|  | #200 | 4.9 | 5.7 |
| Initial coloration |  | B | B |
| State of polymer scale deposition |  | C | C |

As seen from Tables 1 to 4, the comparatively low polymerized vinyl chloride polymers obtained according to the process of the present invention had a high quality in bulk specific gravity, particle size distribution and initial coloration, although the polymerization time was shortened. Further, it was recognized that polymer scale deposition at the gaseous phase and liquid phase in the polymerization vessel was suppressed by the present process.

Example 4

First, a polymer scale deposition preventive agent (III) of the present invention was produced in the following manner.

800 g of methanol, 100 g of dimethylformamide (DMF), and 40 g of 4,4'-diaminodiphenyl sulfone were charged into a reactor equipped with a reflux condenser and having an internal volume of 2 liters and they were stirred at room temperature, so that the 4,4'-diaminodiphenyl sulfone was dissolved in the methanol/DMF.

60 g of α-naphthoquinone was added to the thus obtained methanol/DMF solution, then the temperature was elevated to 65° C., and the reaction was carried out at 65° C. for 24 hours. Then the resulting reaction mixture was cooled and then added dropwise to water. The thus separated precipitate was filtered and dried to obtain a condensate (a-2).

This condensate (a-2), gelatin (b) as the water-soluble polymer compound, and the same colloidal silica (c) as used in Example 1 as the inorganic colloid; (c) were dissolved or dispersed in a solvent made up of water/methanol (in a weight ratio of 7/3) to prepare such a solution that the weight ratio of (a-2)/(b)/(c) =1/1/1 (weight ratio) and the total concentration of (a-2)+(b)+(c) was 0.5%, and then the pH of the solution was adjusted to 11.0 with NaOH to obtain a polymer scale deposition preventive agent (III).

The thus prepared polymer scale deposition preventive agent (III) was applied to the inner wall of a stainless steel polymerization vessel as used in Example 1, the stirring shaft, the stirring blades, and other parts with which a monomer would be contact during the polymerization and was heated at 40° C. for 15 minutes to be dried to thereby form a coating and then the inside of the polymerization vessel was washed with water.

Then similarly to Example 1, an aqueous solution of 210 g of a partially saponified polyvinyl alcohol and 140 g of hydroxypropylmethylcellulose in 880 kg of deionized water was charged into the polymerization vessel. After the inside of the polymerization vessel was evacuated to 50 mmHg, 700 kg of vinyl chloride monomer was charged, then the polymerization initiator shown in Table 5 was pumped into the polymerization vessel with stirring, and at the same time the temperature was elevated to start the polymerization.

The polymerization reaction was carried out while keeping the polymerization temperature at 63° C., and when the internal pressure of the polymerization vessel reached 7.5 kg/cm$^2$G, the polymerization was stopped, then the unreacted monomer was recovered, the obtained polymer in a slurry state was taken out of the polymerization vessel and the polymer was dehydrated and dried.

Comparative Example 9

The same polymer scale preventive agent (II) as in Comparative Example 1 was prepared. The polymer scale deposition preventive agent (II) was applied to the inside of a polymerization vessel similarly to Example 4, and then was heated at 50° C. for 10 minutes to be dried to thereby form a coating, and the inside of the polymerization vessel was washed with water.

Then, the polymerization of vinyl chloride monomer was carried out similarly to Example 4, except that the polymerization initiator shown in Table 5 was used, thereby obtaining a polymer.

Comparative Example 10

The polymerization of Comparative Example 9 was repeated, except that the polymerization initiator shown in Table 5 was used, thereby obtaining a polymer.

Comparative Example 11

The polymerization of Example 4 was repeated, except that the polymerization initiator shown in Table 5 was used, thereby obtaining a polymer.

Example 5

After a coating of the polymer scale deposition preventive agent (III) was formed on the inside of a polymerization vessel in the same manner as in Example 4 and the inside of the vessel was washed with water, an aqueous solution of 303 g of a partially saponified polyvinyl alcohol and 240 g of hydroxypropylmethylcellulose in 870 kg of deionized water was charged into the polymerization vessel. After the inside of the polymerization vessel was evacuated to 50 mmHg, 730 kg of vinyl chloride monomer was charged, then the polymerization initiator shown in Table 6 was pumped into the polymerization vessel with stirring, and at the same time the temperature was elevated to start the polymerization. After 1 hour from starting the elavation of the temperature, 204 g of 2-mercaptoethanol was pumped into the vessel.

The polymerization reaction was carried out while keeping the polymerization temperature at 62° C., then when the internal pressure of the polymerization vessel reached 7.2 kg/cm$^2$G, the polymerization was stopped, and the unreacted monomer was recovered. After the obtained polymer in a slurry state was taken out of the polymerization vessel, the polymer was dehydrated and dried.

Example 6

The polymerization of Example 5 was repeated, except that the polymerization initiator shown in Table 6 was used, thereby obtaining a polymer.

Comparative Examples 12 and 13

In each of Comparative Examples 12 and 13, the polymerization of Example 5 was repeated to obtain a polymer, except that: the polymer scale deposition preventive agent (II) was used in place of the polymer scale deposition preventive agent (III), a coating was formed on the inside of a polymerization vessel in the same manner as in Comparative Example 9 and therafter the inside of the vessel was washed with water, and the polymerization initiator shown in Table 6 was used.

The quality (average polymerization degree, bulk specific gravity, particle size distribution, initial coloration and state of polymer scale deposition) of each of the thus obtained polymers was evaluated by the same methods as hereinbefore described. The results are shown in Tables 5 and 6.

distribution and initial coloration of each polymer were not adversely affected, although the polymerization time was shortened. Further, it was recognized that polymer scale deposition at the gaseous phase and liquid phase in the polymerization vessel was suppressed by the present process.

We claim:

1. A process of producing a vinyl chloride polymer, which comprises suspension polymerizing a vinyl chloride monomer material consisting of either vinyl chloride or a mixture of vinyl monomers containing vinyl chloride in an aqueous medium in the presence of an oil-soluble polymerization initiator in a polymerization vessel having, at its inner wall surface, a polymer scale deposition preventive coating, wherein said polymer scale deposition preventive coating has been formed by applying an alkaline coating liquid to said inner wall surface, followed by drying, said alkaline coating liquid comprising:

(a) at least one condensation product selected from the group consisting of (a-1) a condensate, which has a molecular weight of 400 to 50,000, of a quinone compound and (a-2) a condensate of a quinone com-

TABLE 5

|  | Example 4 | Comparative Example 9 | Comparative Example 10 | Comparative Example 11 |
|---|---|---|---|---|
| Scale deposition preventive agent | III | II | II | III |
| Polymerization initiator | BPNp/BPD = 1/1 | THP/BPD = 1/1 | BPNp/BPD = 1/1 | THP/BPD = 1/1 |
| (weight % based on monomer) | 0.044 | 0.060 | 0.044 | 0.060 |
| Polymerization time | 4 hr 13 min | 4 hr 30 min | 4 hr 14 min | 4 hr 31 min |
| Average polymerization degree | 820 | 820 | 820 | 820 |
| Bulk specific gravity (g/mL) | 0.570 | 0.565 | 0.567 | 0.566 |
| Particle size distribution (pass %) #60 | 100 | 100 | 100 | 100 |
| #100 | 64.4 | 63.1 | 65.2 | 61.9 |
| #200 | 1.4 | 1.2 | 1.5 | 1.0 |
| Initial coloration | A | B | B | B |
| State of polymer scale deposition | A | D | B | B |

TABLE 6

|  | Example 5 | Example 6 | Comparative Example 12 | Comparative Example 13 |
|---|---|---|---|---|
| Scale deposition preventive agent | III | III | II | II |
| Polymerization initiator | BPNp/BPD = 1/2 | BPNp/BPD = 1/1 | THP/BPD = 4/5 | HPV/BPD = 1/1 |
| (weight % based on monomer) | 0.064 | 0.060 | 0.075 | 0.060 |
| Polymerization time | 3 hr 50 min | 4 hr | 4 hr 40 min | 4 hr 20 min |
| Average polymerization degree | 690 | 690 | 690 | 690 |
| Bulk specific gravity (g/mL) | 0.562 | 0.562 | 0.555 | 0.560 |
| Particle size distribution (pass %) #60 | 100 | 100 | 100 | 100 |
| #100 | 89.3 | 90.1 | 90.0 | 87.8 |
| #200 | 4.3 | 4.5 | 4.5 | 3.1 |
| Initial coloration | A | A | B | B |
| State of polymer scale deposition | A | A | D | C |

As also seen from the results of Tables 1 to 4, the comparatively low polymerized vinyl chloride polymers obtained according to the process of the present invention had such a quality that the bulk specific gravity, particle size pound with a diphenyl compound containing at least two amino groups represented by the following general formula (1):

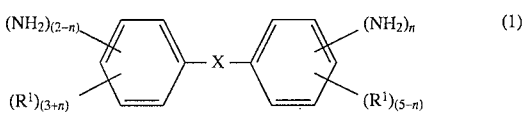

wherein a plurality of $R^1$, which may be the same or different, represent —H, —OH, —COOH, —SO$_3$H, —NH$_2$, —Cl, —NO$_2$, —COCH$_3$, —OCH$_3$, —N(CH$_3$)$_2$, and an alkyl group having 1 to 3 carbon atoms, X represents a bivalent group selected from the group consisting of an alkylene group having 1 to 5 carbon atoms, —N(CH$_3$)—, —C(CH$_3$)$_2$—, —CONH—, —P(=O)H—, —SO$_2$—, —O—, —S—, and —Si(R)$_2$— in which R represents an alkyl group having 1 to 10 carbon atoms, and n is an integer of from 1 to 2, and (b) at least one substance selected from the group consisting of a water-soluble polymer compound, an inorganic colloid and an alkali metal silicate; and wherein said oil-soluble polymerization initiator comprises a combination of:
(A) a t-butyl peroxyneoheptanoate, and
(B) a peresteric peroxide other than the t-butyl peroxyneoheptanoate of the above component (A), said peresteic peroxide of (B) being such that a 10-hour half-life period temperature of a benzene solution containing 0.1 mol of the peresteric peroxide per liter of benzene is 44° to 55° C.

2. The process of claim 1, wherein the quinone compound constituting the condensate (a-1) or the condensate (a-2) is at least one compound selected from the group consisting of the compounds represented by the following general formulae (2) to (5):

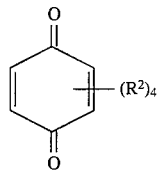

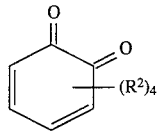

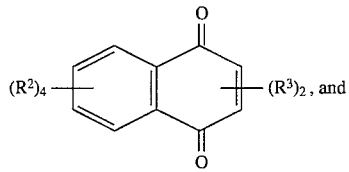

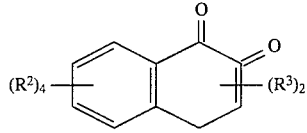

wherein $R^2$, which are the same or different, represent a group selected from the group consisting of —H, —NH$_2$, —Cl, —Br, —OH, —NO$_2$, —COCH$_3$, —OCH$_3$, —N(CH$_3$)$_2$, —COOH, —SO$_3$H, and an alkyl group having 1 to 3 carbon atoms, and a plurality of $R^3$, which are the same or different, represent a group selected from the group consisting of —H, —Cl, —Br, —OH, -COCH$_3$, —OCH$_3$, —CH$_3$, —COOH, and —SO$_3$H.

3. The process of claim 1, wherein the quinone compound is at least one compound selected from the group consisting of o- and p-benzoquinones, α-naphthoquinone, β-naphthoquinone, and lawsone.

4. The process of claim 1, the molecular weight of the condensate (a-1) is in the range of 600 to 20,000.

5. The process of claim 1, wherein the amino groups-containing diphenyl compound is at least one compound selected from the group consisting of 4,4'-diaminodiphenyl sulfone, 4,4'-diaminobenzanilide, 4,4'-diaminodiphenyl ether, and 4,4'-diaminodiphenylmethane.

6. The process of claim 1, wherein the amount of the quinone compound constituting the condensate (a-2) is in the range of 0.01 to 10 parts by weight per part by weight of the amino groups-containing diphenyl compound.

7. The process of claim 1, wherein the water-soluble polymer compound is at least one member selected from the group consisting of gelatin, casein, polyacrylic acid, carboxymethylcellulose, polyvinylpyrrolidone, and pectin.

8. The process of claim 1, wherein the inorganic colloid is at least one member selected from the group consisting of colloids of oxides and colloids of hydroxides of metals selected from the group consisting of aluminum, titanium, zirconium, tin, and iron, and colloidal silica.

9. The process of claim 1, wherein the alkali metal silicate is at least one member selected from the group consisting of a metasilicate ($M_2SiO_3$), an orthosilicate ($M_4SiO_4$), a disilicate ($M_2Si_2O_3$), a trisilicate ($M_3Si_3O_7$), and a sesquisilicate ($M_4Si_3O_{10}$) of an alkali metal, wherein M represents an alkali metal, and water glass.

10. The process of claim 1, wherein the amount of the component (b) is in the range of 0.01 to 10 parts by weight per part by weight of the condensation product of the component (a).

11. The process of claim 1, wherein the component (b) is a combination of the water-soluble polymer compound with at least one member selected from the group consisting of the inorganic colloid and the alkali metal silicate.

12. The process of claim 1, wherein the pH of the coating liquid is in the range of 7.5 to 13.5.

13. The process of claim 1, wherein a solvent used in the coating liquid is water or a mixed solvent of water and an organic solvent compatible with water.

14. The process of claim 1, wherein the peresteric peroxide constituting the oil-soluble polymerization initiator is at least one compound selected from the group consisting of t-butyl peroxyneodecanoate, t-hexyl peroxyneohexanoate, t-hexyl peroxyneodecanoate and t-butyl peroxyneohexanoate.

15. The process of claim 1, wherein the weight ratio of the component (A) to the component (B) each constituting the oil-soluble polymerization initiator is in the range of 1/9 to 9/1.

16. The process of claim 1, wherein the amount of the oil-soluble polymerization initiator consisting of the combination of the component (A) with the component (B) is in the range of 0.02 to 0.12 parts by weight per 100 parts by weight of the monomer material.

17. The process of claim 1, wherein the polymerization temperature is in the range of 40° to 70° C.

18. The process of claim 1, wherein the coating amount of said polymer scale deposition preventive coating after drying is 0.001 to 5 g/m$^2$.

19. The process of claim 1, wherein the vinyl monomer other than vinyl chloride in the mixture of the vinyl monomers containing vinyl chloride is at least one compound selected from the group consisting of α-olefins, acrylic acid and its esters, methacrylic acid and its esters, maleic acid and its esters, vinyl esters, vinyl ethers, maleic anhydride, acrylonitrile, styrene, and vinylidene chloride.

20. The process of claim 1, wherein said polymer scale deposition preventive coating has been formed, in addition to the inner wall surface of the polymerization vessel, on other parts with which the monomer material will contact during the polymerization.

* * * * *